US012730470B2

(12) United States Patent
Adamski

(10) Patent No.: US 12,730,470 B2
(45) **Date of Patent: *Sep. 8, 2026**

(54) CURRENT MIRROR PRE-BIAS FOR INCREASED TRANSITION SPEED

(71) Applicant: pSemi Corporation, San Diego, CA (US)

(72) Inventor: Jaroslaw Adamski, Streamwood, IL (US)

(73) Assignee: PSEMI CORPORATION, San Diego, CA (US)

( * ) Notice: Subject to any disclaimer, the term of this patent is extended or adjusted under 35 U.S.C. 154(b) by 157 days.

This patent is subject to a terminal disclaimer.

(21) Appl. No.: 18/426,197

(22) Filed: Jan. 29, 2024

(65) Prior Publication Data

US 2024/0168509 A1 May 23, 2024

Related U.S. Application Data

(63) Continuation of application No. PCT/US2022/038879, filed on Jul. 29, 2022, which is a continuation of application No. 17/398,978, filed on Aug. 10, 2021, now Pat. No. 11,789,481.

(51) Int. Cl.
*G05F 3/26* (2006.01)

(52) U.S. Cl.
CPC .................................... *G05F 3/262* (2013.01)

(58) Field of Classification Search
CPC .............................................. G05F 3/24–3/267
See application file for complete search history.

(56) References Cited

U.S. PATENT DOCUMENTS 5,640,681 A 6/1997 Barrett, Jr. et al.
6,538,496 B1 * 3/2003 Tanase .................... G05F 3/262 327/543
9,312,747 B1 4/2016 Svorc
(Continued)

FOREIGN PATENT DOCUMENTS

WO 2023/018563 A1 2/2023

OTHER PUBLICATIONS

International Search Report & Written Opinion for PCT/US2022/038879 filed Jul. 29, 2022 on behalf of pSemi Corporation, Mail Date: Nov. 17, 2022, 9 pages.
(Continued)

*Primary Examiner* — Fred E Finch, III
(74) *Attorney, Agent, or Firm* — Steinfl + Bruno LLP

(57) ABSTRACT

Methods and devices for speeding up the onset of a target current through an output leg of a current mirror are presented. Upon activation of the current mirror, a pre-charge current is sourced to a node of the current mirror that is common to the output leg and an input leg of the current mirror. Sourcing of the pre-charge current is based on sensing, by a first transistor, of a voltage at the common node. Pre-charging of the common node continues up to a cutoff voltage sensed at the common node. Sourcing of the pre-charge current is provided by a second transistor coupled to the common node. Based on the voltage sensed at the common node, the first transistor controls the sourcing of the pre-charge current by the second transistor. Such control is based on a portion of a current from a current source that flows through the first transistor.

23 Claims, 12 Drawing Sheets

(56) References Cited

U.S. PATENT DOCUMENTS

| | | | |
|---|---|---|---|
| 10,038,418 B1 | 7/2018 | Ayranci et al. | |
| 10,396,772 B2 | 8/2019 | Shanjani et al. | |
| 10,587,225 B2 | 3/2020 | Klaren et al. | |
| 10,938,349 B1 * | 3/2021 | Ayranci | H03F 1/0205 |
| 11,789,481 B2 * | 10/2023 | Adamski | G05F 3/262 323/273 |
| 2005/0062519 A1 | 3/2005 | Ganivet et al. | |
| 2005/0099234 A1 | 5/2005 | Perner et al. | |
| 2007/0241738 A1 | 10/2007 | Baranauskas et al. | |
| 2007/0285171 A1 | 12/2007 | Karthaus et al. | |
| 2008/0284501 A1 | 11/2008 | Kim | |
| 2013/0278239 A1 | 10/2013 | Dong | |
| 2016/0147246 A1 | 5/2016 | Svorc | |
| 2018/0083578 A1 * | 3/2018 | Klaren | H03F 3/213 |
| 2018/0188763 A1 * | 7/2018 | Pasotti | G05F 3/26 |
| 2021/0013841 A1 | 1/2021 | Klaren et al. | |
| 2023/0051805 A1 | 2/2023 | Adamski | |

OTHER PUBLICATIONS

Non-Final Office Action for U.S. Appl. No. 17/398,978, filed Aug. 10, 2021 on behalf of pSemi Corporation Mail Date: Jan. 19, 2023 29 pages.

Notice of Allowance for U.S. Appl. No. 17/398,978, filed Aug. 10, 2021 on behalf of pSemi Corporation Mail Date: Jun. 26, 2023 6 pages.

* cited by examiner

Prior Art

100B

100D

*Prior Art*

220E

CURRENT MIRROR PRE-BIAS FOR INCREASED TRANSITION SPEED

CROSS-REFERENCE TO RELATED APPLICATIONS

The present application is a continuation of International Application No. PCT/US2022/038879 filed on Jul. 29, 2022, which, in turn, is a continuation of U.S. patent application Ser. No. 17/398,978, filed on Aug. 10, 2021, titled "CURRENT MIRROR PRE-BIAS FOR INCREASED TRANSITION SPEED", now U.S. Pat. No. 11,789,481, all of which are herein incorporated by reference in their entireties.

TECHNICAL FIELD

The present disclosure relates to current mirror circuits that may be used to generate DC bias currents, and more particularly to methods and apparatus for improving a transition speed to an onset of a mirrored DC bias current.

BACKGROUND

FIG. 1A shows a prior art configuration (e.g., circuital arrangement) of a current mirror (100A) for generation of a DC bias current $I_{OUT}$ used by a device (110). A reference current, $I_{REF}$, flowing through an input leg of the current mirror (100A) is mirrored to an output current, $I_{OUT}$, flowing through an output leg of the current mirror (100A). The input leg includes an N-type transistor $M'_{N10}$ in series connection with a current source that generates the reference current, $I_{REF}$. The transistor $M'_{N10}$ is in a diode-connected (common-source) configuration so that its gate self-biases to a voltage for conduction of the reference current, $I_{REF}$. The output leg includes an N-type transistor $M_{N10}$ (common-source) with a gate that is coupled (connected), through a (common) node $N_{10}$, to the gate of the transistor $M'_{N10}$ of the input leg (node $N_{10}$ can therefore be considered a common node of the input and output legs). Accordingly, the output current, $I_{OUT}$, that flows through the transistor $M_{N10}$ can be made to be ratiometrically related to the reference current, $I_{REF}$, by making the two transistors ($M_{N10}$, $M'_{N10}$) of a same characteristic but different size (e.g., width and/or length). In turn, a magnitude of the output current, $I_{OUT}$, can be made substantially larger than a magnitude of the reference current, $I_{REF}$, while tracking said reference current over process and temperature variations. In other words, $I_{OUT}=k\times I_{REF}$, with k being a constant representing a ratio in size of the two transistors ($M_{N10}$, $M'_{N10}$) and independent from process and temperature variations.

Typical applications of the prior art current mirror (100A) may include provision of a biasing current to an active device (110), such as for example, a power amplifier (PA). In such configuration, the output leg ($M_{N10}$) may be a conduction path of a PA (110) including an input transistor $M_{N10}$ of the PA that is configured to receive, for example, a radio frequency (RF) signal, $RF_{IN}$, for amplification through the PA and output an amplified RF signal, $RF_{OUT}$. In such exemplary PA (110) configuration, the input RF signal, $RF_{IN}$, and the output RF signal, $RF_{OUT}$, may be coupled to the PA (110) via respective DC decoupling capacitors $C_{IN}$ and $C_{OUT}$. In alternative configurations, the output current, TOUT, may be further mirrored prior to provision to a power amplifier via a current mirror configuration similar to one shown in FIG. 1A (e.g., different transistor polarity). Furthermore, as shown in the configuration (100B) of FIG. 1B, the active device (110) may include one or more cascode devices (e.g., $M_{N11}$, . . . etc.) in series connection with the (input) transistor ($M_{N10}$) in the output leg. The cascoded configuration (100B) shown in FIG. 1B is well-known in the art, particularly for applications wherein the active device (e.g., 110, PA) is subjected to voltages (e.g., supply voltage $V_{DD}$) that are higher than a withstand voltage of its constituent transistors (e.g., $M_{N10}$, $M_{N11}$, . . . , etc.).

With further reference to FIG. 1B, (gate) biasing to the one or more cascode devices (e.g., $M_{N11}$, . . . etc.) of the output leg is provided via respective one or more cascode devices (e.g., $M'_{N11}$, . . . etc.) in series connection with the transistor ($M'_{N10}$) in the input leg, gates of respective cascode devices in the input and output legs coupled (connected) to one another through respective nodes (e.g., $N_{11}$, . . . , etc.). As known to a person skilled in the art, operation of the cascoded configuration (100B) shown in FIG. 1B, includes use of the transistors ($M'_{N10}$, $M'_{N11}$, . . . , etc.) as a (reduced-size)) replica circuit of a main circuit (e.g., active device, PA, 110) that includes the transistors ($M_{N10}$, $M_{N11}$, . . . , etc.), for generating gate biasing voltages for flow of the output current $I_{OUT}$ (e.g., $I_{OUT}=k\times I_{REF}$) through the main circuit.

With reference to the configuration (100C) of FIG. 1C, in order to save power during an inactive state (mode of operation) of the active device (110), a switching arrangement ($R_1$, $M_{N2}$) coupled to the node $N_{10}$ may be used to short the respective gates of the transistors ($M_{N10}$, $M'_{N10}$), thereby preventing conduction of current through said transistors. For example, by turning ON the N-type transistor switch $M_{N2}$ via an enabling/disabling control signal, /Ena, the node $N_{10}$ can be shorted to the reference ground (coupled to the source of $M_{N2}$). Further power saving may be obtained by disabling the current source that generates the reference current, $I_{REF}$, as shown in FIG. 1D. Power savings via such switching arrangements may include preventing conduction of leakage currents through elements of the circuit (e.g., $M_{N10}$, $M'_{N10}$)

FIG. 1D shows a prior art current mirror (100D) that may be used as the current source that generates the reference current, $I_{REF}$. A person skilled in the art will clearly recognize a P-type current mirror that is the dual of the N-type current mirror described above with reference to FIG. 1A, wherein elements ($M_{P10}$, $M'_{P10}$, $I'_{REF}$, $P_{10}$) may be likened to the elements ($M_{N10}$, $M'_{N10}$, $I_{REF}$, $N_{10}$). Accordingly, the current mirror (100D) can be used to mirror a current $I'_{REF}$ that flows in the first leg ($M'_{P10}$, $I'_{REF}$) to produce the current $I_{REF}$ that flows through the second leg ($M_{P10}$). As known to a person skilled in the art, the current $I'_{REF}$ may be a primary (reference) current designed for a certain performance metric with respect to process and/or temperature variations. A P-type transistor switch, $M_{P2}$, coupled to the node $P_{10}$ can be used to deactivate the P-type current mirror (100D). For example, by turning ON the P-type transistor switch $M_{P2}$ via an enabling/disabling control signal, Ena, the node $P_{10}$ can be shorted to the supply voltage $V_{DD}$ (coupled to the source of $M_{P12}$). It should be noted that in the exemplary configuration of the switching arrangements shown in FIGS. 1C and 1D, the signal /Ena of FIG. 1C is the complementary of the signal Ena of FIG. 1D.

As described above, when the current mirror ($M_{N10}$, $M'_{N10}$, $I_{REF}$) of FIG. 1C is deactivated (e.g., /Ena is high), the node $N_{10}$, and therefore the gate of the transistor $M_{N10}$, is at the reference ground (e.g., zero volts) and no current flows through the respective input/output legs of the current mirror. When the current mirror is activated (e.g., /Ena is low), current starts flowing through the first leg ($M'_{N10}$, $I_{REF}$), thereby charging the node $N_{10}$ towards a steady state voltage level for conduction of the respective currents ($I_{REF}$, $I_{OUT}$) through the two legs. However, charging of the node $N_{10}$ includes charging of an input capacitance of the transistor $M_{N10}$ which is a function of the size of the transistor $M_{N10}$. As the transistor $M_{N10}$ can have a large size (e.g., ×10 or more compared to $M'_{N10}$) for provision of a large current $I_{OUT}$ relative to the reference current $I_{REF}$ (e.g., large value of the ratio k for $I_{OUT}$=k×$I_{REF}$), a charging time of the node $N_{10}$ to the steady state voltage level can be relatively long, for example equal to, or longer than, one microsecond (1 μs). Because an onset of the output current, $I_{OUT}$, through the output leg ($M_{N10}$) is based on such charging time, effective/stable operation of the active device (110) subsequent to activation of the current mirror ($M_{N10}$, $M'_{N10}$, $I_{REF}$) is delayed by a time at least equal to the charging time. Such charging time may be reduced by decreasing the size of the transistor $M_{N10}$ while maintaining a same (large) output current $I_{OUT}$ by increasing the magnitude of the reference current $I_{REF}$. However, such scheme has the drawback of increasing power consumption in the (reference) current mirror circuit (input leg) used to generate the reference current $I_{REF}$.

Teachings according to the present disclosure are aimed at reducing such charging time without sacrificing power consumption in a current mirror.

SUMMARY

According to a first aspect of the present disclosure, a circuital arrangement is presented, comprising: a main current mirror comprising an input leg and an output leg, the input leg coupled to the output leg through a first common node of the main current mirror; and a pre-charging circuit coupled to the first common node, the pre-charging circuit comprising: a first transistor coupled to the first common node, the first transistor configured to sense a voltage at the first common node; and a second transistor coupled to the first common node, the second transistor configured to source a pre-charge current to the first common node based on a voltage sensed at the first common node by the first transistor.

According to a second aspect of the present disclosure, a method for reducing a transition phase between an inactive state and an active state of a current mirror is presented, the method comprising: sensing, via a first transistor, a voltage at a common node to an input leg and an output leg of the current mirror; based on the sensing, controlling a second transistor to source a pre-charge current to the common node; based on the controlling, speeding up charging of the common node up to a cutoff voltage that is near and below a steady state voltage at the common node; and charging the common node to the steady state voltage via a current through the input leg of the current mirror, thereby causing onset of a target current through the output leg for operation of the current mirror according to the active state.

Further aspects of the disclosure are provided in the description, drawings and claims of the present application.

BRIEF DESCRIPTION OF THE DRAWINGS

The accompanying drawings, which are incorporated into and constitute a part of this specification, illustrate one or more embodiments of the present disclosure and, together with the description of example embodiments, serve to explain the principles and implementations of the disclosure.

Like reference numbers and designations in the various drawings indicate like elements.

DETAILED DESCRIPTION

Figure 1A:
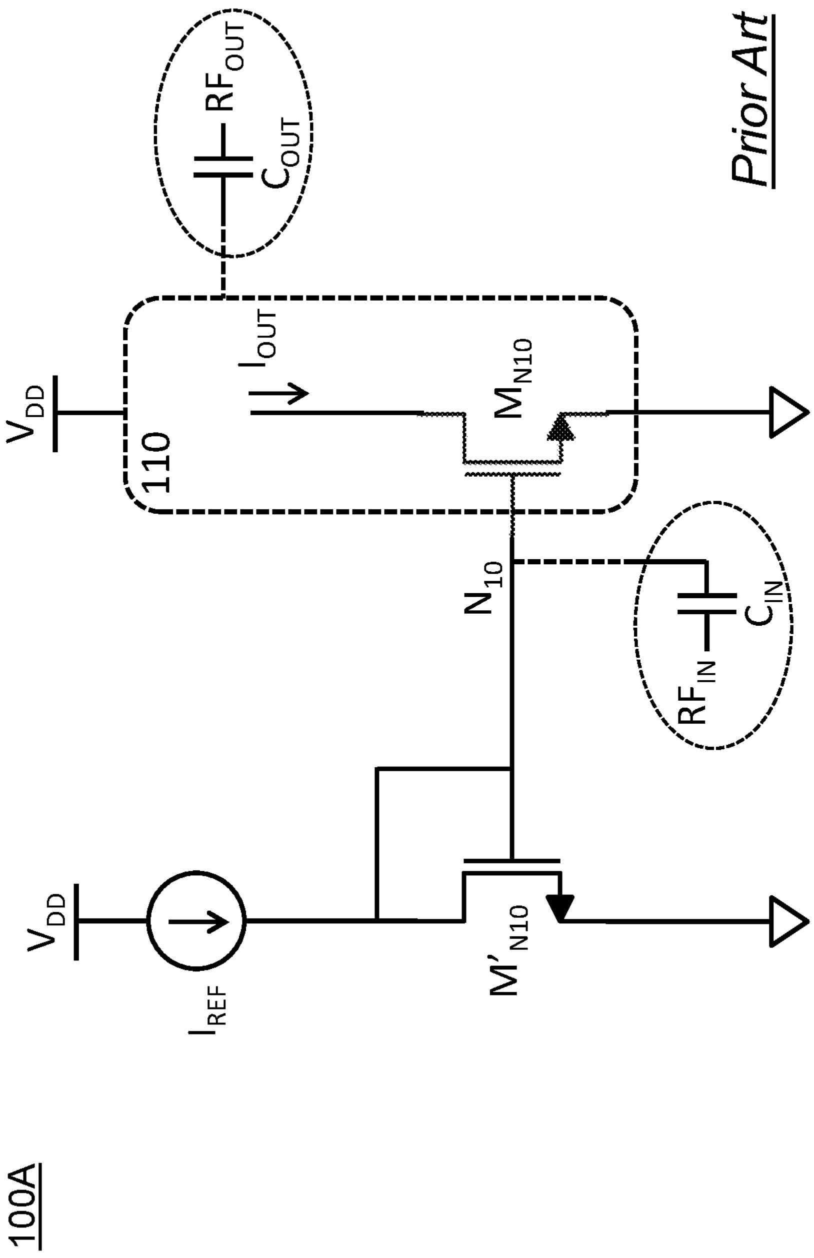
FIG. 1A shows a prior art configuration of an N-type current mirror.
Figure 1B:
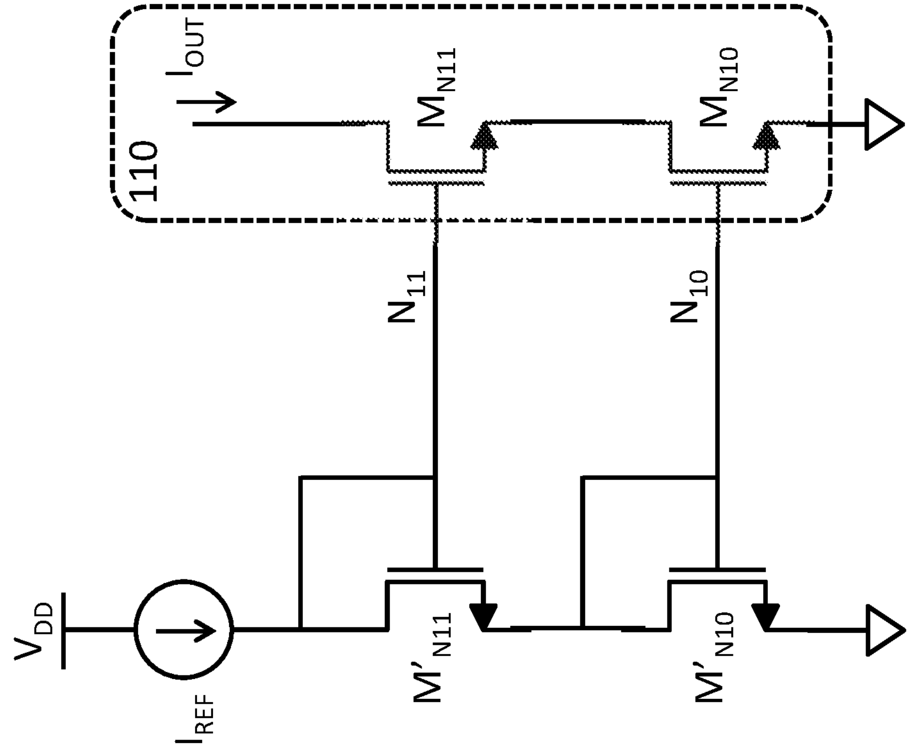
FIG. 1B shows an extension of the prior art configuration of FIG. 1A for a case of a cascoded configuration.
Figure 1C:
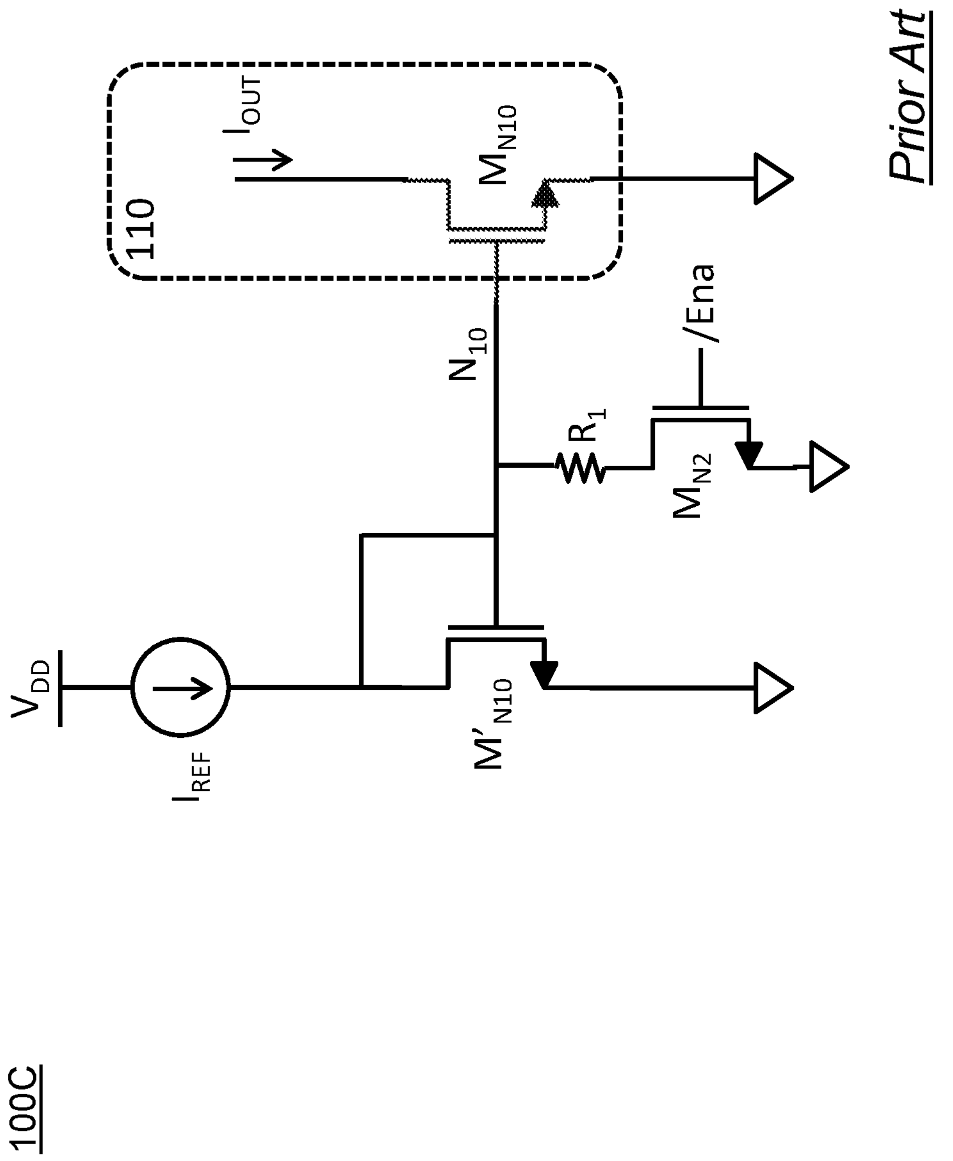
FIG. 1C shows a switching arrangement for activation and deactivation of the current mirror of FIG. 1A.
Figure 2:
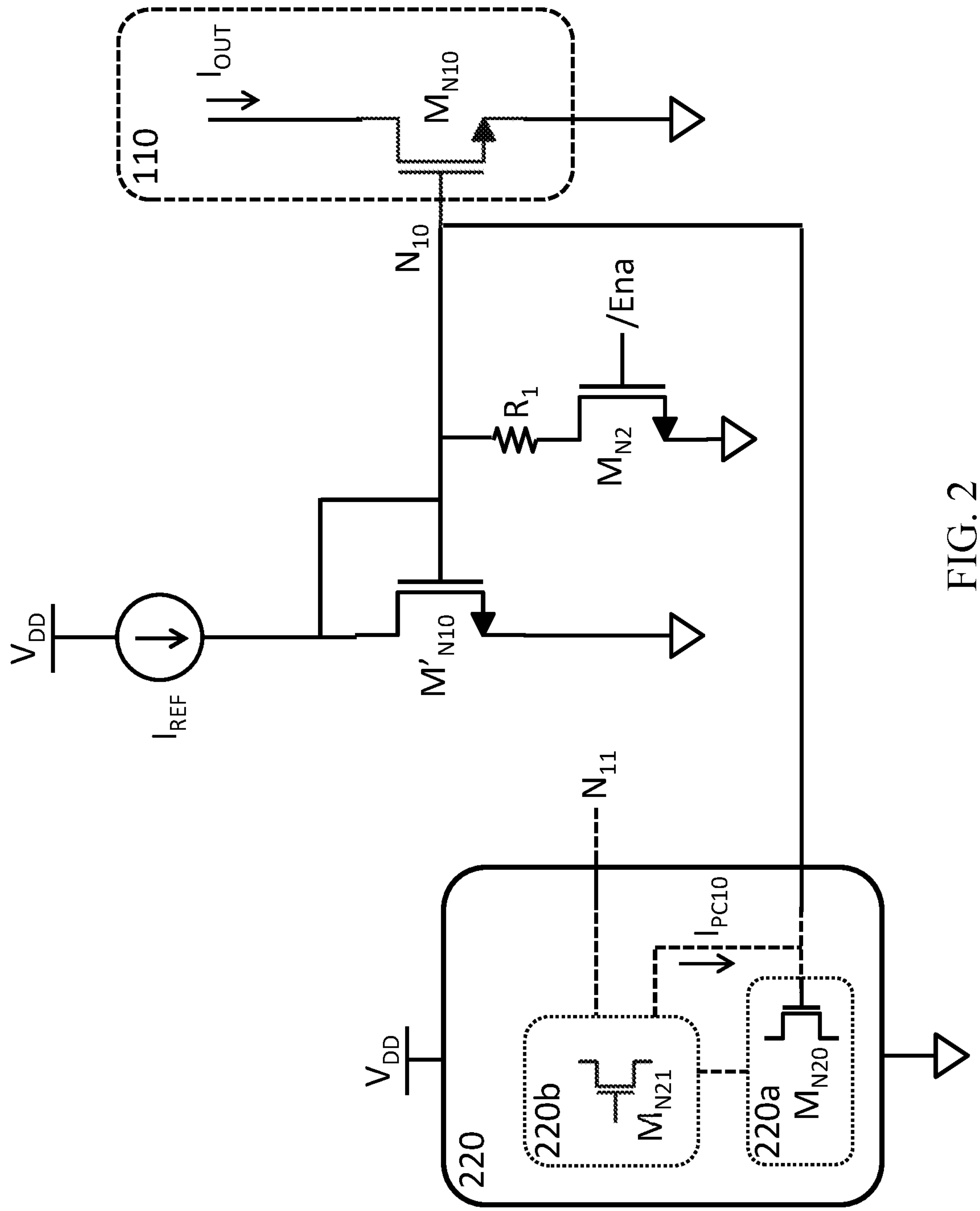
FIG. 2 shows a block diagram of a pre-charging circuit according to an embodiment of the present disclosure used to speed up operation of an N-type current mirror.

FIG. 2 shows a block diagram of a pre-charging circuit (220) according to an embodiment of the present disclosure used to speed up operation of the prior art current mirror ($M_{N10}$, $M'_{N10}$, $I_{REF}$) described above with reference to FIG. 1C. The pre-charging circuit (220) is an active circuit that includes active devices, such as, for example, transistors $M_{N20}$ and $M_{N21}$. As shown in FIG. 2, the pre-charging circuit (220) may operate within a same voltage domain as the current mirror ($M_{N10}$, $M'_{N10}$, $I_{REF}$), the voltage domain defined by the supply voltage, $V_{DD}$, and the reference ground. The pre-charging circuit (220) is coupled to the node $N_{10}$ of the current mirror ($M_{N10}$, $M'_{N10}$, $I_{REF}$) and therefore to the gates of the transistors $M_{N10}$ and $M'_{N10}$. In case the current mirror includes a cascode configuration such as one described with reference to FIG. 1B described above, the pre-charging circuit (220) may further be coupled to nodes ($N_{11}$, . . . , etc.) that connect respective gates of the main ($M_{N10}$, $M_{N11}$, . . . , etc.) and replica ($M'_{N10}$, $M'_{N11}$, . . . , etc.) circuits.

According to an embodiment of the present disclosure, coupling of the pre-charging circuit (220) of FIG. 2 to the node, $N_{10}$, of the current mirror (e.g., $M_{N10}$, $M'_{N10}$, $I_{REF}$) allows a transistor ($M_{N20}$) of a sensing circuit (220*a*) of the pre-charging circuit (220) to sense a level of a voltage at the coupled node, $N_{10}$. According to an embodiment of the present disclosure, the sensing circuit (220) controls operation of a current sourcing circuit (220*b*) based on the level of the voltage sensed at the coupled node, $N_{10}$. According to an embodiment of the present disclosure, the current sourcing circuit (220*b*) includes a transistor ($M_{N21}$) that is coupled to the node, $N_{10}$. Under control of the sensing circuit (220), the transistor ($M_{N21}$) may charge the node $N_{10}$ via a pre-charge current, $I_{PC10}$, or a burst of a pre-charge current, $I_{PC10}$.

According to an embodiment of the present disclosure, when activated, the pre-charging circuit (220) may be used to pre-charge the node $N_{10}$ to a pre-charge voltage that is near, but lower than, a steady state voltage at the node $N_{10}$ during normal operation of the current mirror ($M_{N10}$, $M'_{N10}$, $I_{REF}$). Once the pre-charge voltage is reached, the pre-charging circuit (220) may stop provision (e.g., sourcing) of the pre-charge current, $I_{PC10}$, to the node $N_{10}$, with a reduced effect on operation of the current mirror ($M_{N10}$, $M'_{N10}$, $I_{REF}$). Accordingly, the pre-charge voltage may be considered as a cutoff voltage of the pre-charging circuit (220). Once the pre-charge current $I_{PC10}$ stops flowing, the node $N_{10}$ continues to charge up to the steady state voltage solely based on the reference current $I_{REF}$. Accordingly, reduction in the charging time of the node $N_{10}$ is obtained by provision of the pre-charge current, $I_{PC10}$, provided as a burst of current, which in combination with the reference current, $I_{REF}$, speed up charging of the node $N_{10}$ from zero volts (instant right after activation) to the pre-charge voltage, and therefore (substantially) reduce a time during which the node $N_{10}$ is (slowly) charged solely via the reference current, $I_{REF}$. In case of coupling to a plurality of nodes (e.g., $N_{10}$, $N_{11}$, . . . , etc. of FIG. 1B), the sensing circuit (220*a*) may control a plurality of current sourcing circuits (e.g., 220*b*) each including a transistor (e.g., $M_{N21}$) coupled to a respective node of the plurality of nodes for provision of a respective pre-charge current. Such control of the plurality of current sources may be based to a voltage sensed at a single node (e.g., node $N_{10}$) by the sensing circuit (220*a*).

According to an embodiment of the present disclosure, the (a level of the) pre-charge voltage may be adjustable. Adjusting of the pre-charge voltage may be provided via a resistor, a size of a transistor, a ratio of sizes of two transistors, or any combination thereof. According to an exemplary embodiment of the present disclosure, the ratio of the sizes of the two transistors may be with respect to a transistor of the pre-charging circuit (e.g., $M_{N20}$ of FIG. 2) and a transistor of the current mirror (e.g., $M_{N10}$, $M'_{N10}$ of FIG. 2, or $M_{P10}$ of FIG. 1D). According to a further embodiment of the present disclosure, the pre-charge voltage may be selected based on a desired magnitude of the current ($I_{OUT}$) through the output leg (e.g., $M_{N10}$ of FIG. 2) during a transition state/phase from a deactivated state to an activated (steady state) state of the current mirror ($M_{N10}$, $M'_{N10}$, $I_{REF}$). Various relationships between sizes of devices, currents through the devices and biasing voltages to the devices for establishing operation of the pre-charging circuit (220) for a given/desired pre-charge voltage may be obtained via circuit simulation software and/or experimental testing according to well-known in the art systems and procedures, description of which is beyond the scope of the present disclosure.

A sequence of events for pre-charging the node $N_{10}$ via the pre-charging circuit (220) of FIG. 2 may include: upon activation of the current mirror ($M_{N10}$, $M'_{N10}$, $I_{REF}$) via, for example, the control signal, /Ena, (optionally) activating the pre-charging circuit (220); sensing a voltage level at the node $N_{10}$ via the sensing circuit (220*a*); controlling the current sourcing circuit (220*b*) to start a burst of pre-charge current, $I_{PC10}$, into the node $N_{10}$; further controlling the current sourcing circuit (220*b*) to maintain sourcing of the pre-charge current, $I_{PC10}$, so long the sensed voltage at the node $N_{10}$ is smaller than the pre-charge voltage; and to control the current sourcing circuit (220*b*) to stop the burst of the pre-charge current, $I_{PC10}$, when the sensed voltage at the node $N_{10}$ is equal to, or larger than, the pre-charge voltage. It should be noted that activation of the pre-charge circuit (220) may be optional as in some exemplary configurations, presence of a current required for activation of the pre-charge circuit (220) may be enslaved to the activation of the current mirror (e.g., $M_{N10}$, $M'_{N10}$, $I_{REF}$) itself, and therefore activation of the pre-charge circuit (220) may inherently be provided via activation of the current mirror. Furthermore, it should be noted that when inactive, the pre-charging circuit (220) may not consume any current/power.

Figure 3A:
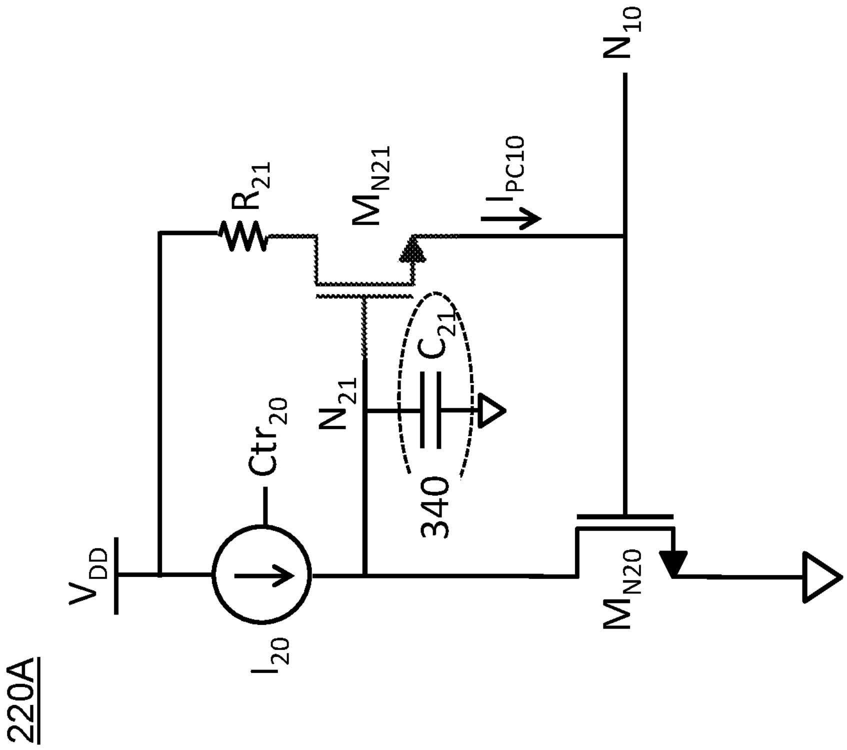
FIG. 3A shows an embodiment according to the present disclosure of the pre-charging circuit of FIG. 2.

FIG. 3A shows an exemplary embodiment according to the present disclosure of a pre-charging circuit (220A) which can be used as the pre-charging circuit (220) described above with reference to FIG. 2, including the transistor $M_{N20}$ used for sensing of the voltage level at the node $N_{10}$, and the transistor $M_{N21}$ used to source the pre-charge current, $I_{PC10}$, to the node $N_{10}$. As can be seen in FIG. 3A, the transistor $M_{N20}$ comprises a gate that is coupled (connected) to the node $N_{10}$; a source that is coupled to the reference ground; and a drain that is coupled, through a node, $N_{21}$, to a current source, $I_{20}$, and to a gate of the transistor $M_{N21}$. A source of the transistor $M_{N21}$ is coupled to the node $N_{10}$, and a drain of the transistor $M_{N21}$ is coupled to the supply voltage $V_{DD}$ through a resistor $R_{21}$.

Figure 3B:
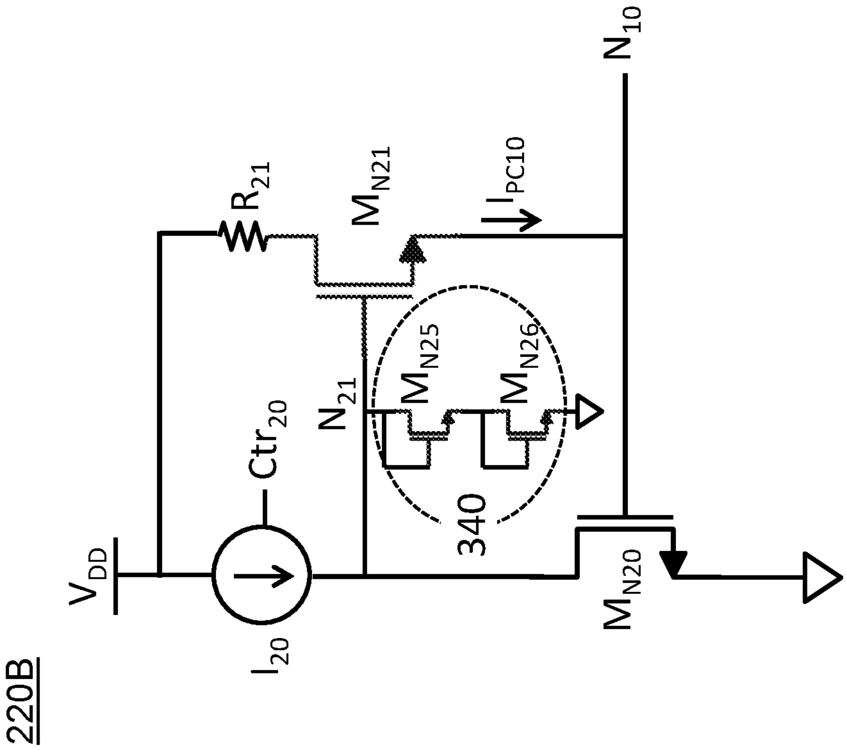
FIG. 3B shows another embodiment according to the present disclosure of the pre-charging circuit of FIG. 2.

An optional DC charging element (340) may be coupled to the node $N_{21}$ as shown in FIG. 3A. The optional element (340) may be used to control/set a DC voltage at the gate of the transistor $M_{N21}$ via a flow of a portion of the current from the current source $I_{20}$ through the node $N_{21}$. In the exemplary implementation shown in FIG. 3A, the optional element (340) may be a capacitor $C_{21}$ that can charge the node $N_{21}$. In another exemplary implementation shown in FIG. 3B, the optional element (340) may be one or more series-connected diodes (e.g., diode-connected N-type transistors $M_{N25}$, $M_{N26}$) that can charge the node $N_{21}$ up to a voltage determined by the diodes thereby allowing some type of the overvoltage protection of the transistor $M_{N21}$ (as well as the transistor $M_{N20}$).

With continued reference to FIG. 3A, a person skilled in the art would recognize that the transistor $M_{N20}$ is arranged as a common-source configuration so that based on a level of the voltage at node $N_{10}$, a current may flow from the (series-connected) current source, $I_{20}$, through the transistor $M_{N20}$. When fully ON, a maximum current though the transistor $M_{N20}$ may be limited by the size of the transistor and the current sourced by the current source $I_{20}$. On the other hand, a person skilled in the art would recognize that the transistor $M_{N21}$ is arranged as a source follower (common-drain configuration), so that based on a voltage difference between the gate and source (i.e., gate-to-source voltage) of the transistor $M_{N21}$, a current, $I_{PC10}$, may flow from the supply voltage $V_{DD}$ to the node $N_{10}$ through the resistor $R_{21}$ and the transistor $M_{N21}$.

As shown in FIG. 3A, the current source $I_{20}$ is controllable via a control signal $Ctr_{20}$ configured to activate and deactivate sourcing of a current through the current source $I_{20}$. Such control of the current source $I_{20}$ may be synchronized to the active and inactive states of the current mirror (e.g., $M_{N10}$, $M'_{N10}$, $I_{REF}$ of FIG. 2 controllable via control signal /Ena). For example, when the current mirror (e.g., $M_{N10}$, $M'_{N10}$, $I_{REF}$ of FIG. 2) is inactive, the current source $I_{20}$ may be controlled not to source/output any current (i.e., current source is inactive), and when the current mirror is active, the current source $I_{20}$ may be controlled to source/output a current (i.e., current source is active).

During the inactive state of the current mirror (e.g., $M_{N10}$, $M'_{N10}$, $I_{REF}$ of FIG. 2 with /Ena at a high level), the node $N_{10}$ shown in FIG. 3A is shorted to the reference ground and therefore is at about zero volts. Furthermore, during the inactive state of the current mirror, the current source $I_{20}$ is also inactive. It follows that during the inactive state, no current flows through either of the transistor $M_{N20}$ or the node $N_{21}$. Accordingly, the gate-to-source voltage of the transistor $M_{N21}$ is also at about zero volts and therefore no current (i.e., $I_{PC10}$=0) is sourced into the node $N_{10}$ through the transistor $M_{N21}$.

During the active state of the current mirror (e.g., $M_{N10}$, $M'_{N10}$, $I_{REF}$ of FIG. 2 with /Ena at a low level), the node $N_{10}$ shown in FIG. 3A is not shorted to the reference ground and therefore can charge, at least through the reference current, $I_{REF}$. At an instant immediately after switching states from the inactive to the active state, the node $N_{10}$ is still close to the zero volts and therefore no current flows through the transistor $M_{N20}$ as the transistor $M_{N20}$ is turned OFF. However, since the current source $I_{20}$ is activated (active, active state, sources current), a current starts to flow from the current source $I_{20}$ to charge the node $N_{21}$ at a rate that is much faster than the rate of charge of the node $N_{10}$. In turn, the node $N_{21}$ charges at a level that allows tuning ON of the transistor $M_{N21}$ and therefore allows flowing of the pre-charge current $I_{PC10}$ into the node $N_{10}$ which in turn speeds up the charging of said node. As the node $N_{10}$ charges, it gradually turns ON the transistor $M_{N20}$ which therefore diverts a portion of the current from the current source $I_{20}$ to flow through the transistor $M_{N20}$. Depending on the configuration of the current source $I_{20}$ as well as a size of the transistor $M_{N20}$, the gradual turning ON of the transistor $M_{N20}$ can result in: a) the totality of the current sourced by the current source $I_{20}$ to flow through the transistor $M_{N20}$, or b) a magnitude of the current through the transistor $M_{N20}$ to lower the voltage at the node $N_{21}$, both of which result in a discharge of the node $N_{21}$, which in combination with the charging of the node $N_{10}$, can turn OFF the transistor $M_{N21}$, and therefore stop flow of the pre-charge current $I_{PC10}$ through the transistor $M_{N21}$.

With continued reference to FIG. 3A, the pre-charge voltage at node $N_{10}$ at which the flow of the pre-charge current $I_{PC10}$ through the transistor $M_{N21}$ stops may be adjusted to a voltage level that is near, but lower than, a steady state voltage at the node $N_{10}$ during normal operation of the current mirror ($M_{N10}$, $M'_{N10}$, $I_{REF}$). This allows the node $N_{10}$ to charge up to its operating (steady state) voltage (e.g., corresponding to flow of the target output current $I_{OUT}$) solely through the reference current $I_{REF}$. Accordingly, the current mirror (e.g., $M_{N10}$, $M'_{N10}$, $I_{REF}$ of FIG. 2) reaches its normal (steady state) active state of operation through a transition phase that includes: a) a fast pre-charge phase of the node $N_{10}$ via a combination of the reference current $I_{REF}$ and the pre-charge current $I_{PC10}$ from an initial voltage (close to zero volts) to the pre-charge voltage, and b) a slow final charge phase of the node $N_{10}$ via the reference current $I_{REF}$ from the pre-charge voltage to the steady state voltage that coincides with the flow of the (target) output current $I_{OUT}$ through the output leg of the current mirror. Adjustment of the pre-charge voltage may be provided via designed characteristics of the current source $I_{20}$ and the transistor $M_{N20}$ as later described with reference to the exemplary embodiments of FIG. 3C and FIG. 3D.

Figure 3C:
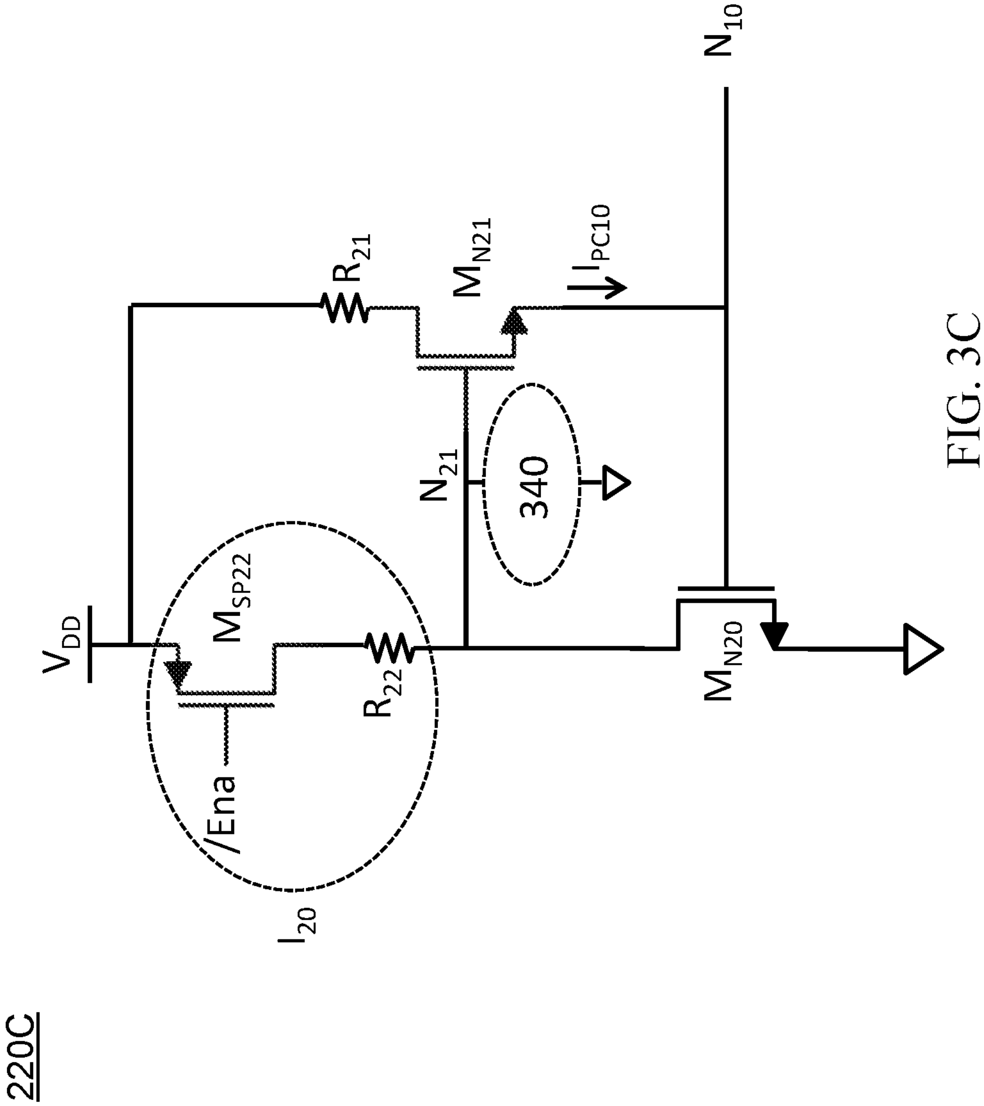
FIG. 3C shows an embodiment according to the present disclosure of the pre-charging circuit of FIG. 2 comprising a resistor to generate a current.

FIG. 3C shows an embodiment according to the present disclosure of a pre-charging circuit (220C) which can be used as the pre-charging circuit (220) described above with reference to FIG. 2. In particular, the pre-charging circuit (220C) represents a specific implementation of the pre-charging circuit (220A) described above with reference to FIG. 3A wherein the current source $I_{20}$ is implemented via a resistor $R_{22}$ in series connection with a P-type transistor switch $M_{SP22}$. Accordingly, operation of the pre-charging circuit (220A) as described above with reference to FIG. 3A equally applies to the pre-charging circuit (220C) of FIG. 3C.

With continued reference to FIG. 3C, activation of the current source $I_{20}$ of the pre-charging circuit (220C) may be synchronized with activation of the current mirror circuit (e.g., $M_{N10}$, $M'_{N10}$, $I_{REF}$ of FIG. 2) via the control signal /Ena. When the control signal /Ena is low (i.e., current mirror activated), the transistor switch $M_{SP22}$ is ON and therefore a current may flow from the supply voltage $V_{DD}$ through the transistor switch $M_{SP22}$ and resistor $R_{22}$. Accordingly, during the fast pre-charge phase of the node $N_{10}$, such current from the current source $I_{20}$ first charges the node $N_{21}$ to turn ON the transistor $M_{N21}$. As the transistor $M_{N20}$ gradually turns ON (conducts current), more current flows through the transistor $M_{N20}$ causing the node $N_{21}$ to gradually discharge down to a voltage level where the gate-to-source voltage of the transistor $M_{N21}$ causes the transistor to turn OFF thereby stopping the flow of the pre-charge current $I_{PC10}$ through the node $N_{10}$. In other words, the voltage at the node $N_{21}$ decreases due to the increased voltage drop across the resistor R 22 as the current through the transistor $M_{N20}$ increases. As described above with reference to, for example, FIG. 3A, the turning OFF of the transistor $M_{N21}$ coincides with the node $N_{10}$ being pre-charged to the pre-charge voltage level, also referred herein as the cutoff voltage.

According to an embodiment of the present disclosure, adjusting of the pre-charge voltage for the configuration shown in FIG. 3C may be provided via a size of the resistor $R_{22}$ that determines a relationship between a current that flows through the transistor switch $M_{SP22}$ and a voltage at the node $N_{21}$, and a size of the transistor $M_{N20}$ that determines a current through the transistor $M_{N20}$ as a function of the voltage at the node $N_{10}$. Accordingly, for a given target pre-charge voltage (i.e., node $N_{10}$) that determines a gate voltage to the transistor $M_{N20}$, the size of the transistor $M_{N20}$ is such as to draw a current through the resistor $R_{22}$ that causes the node $N_{21}$ to discharge to a level for which the gate-to-source voltage (i.e., difference in voltages at nodes $N_{21}$ and $N_{10}$) is such as to turn OFF the transistor $M_{N21}$.

With continued reference to FIG. 3C, it would be clear to a person skilled in the art that (in the active state/mode of operation) once the transistor $M_{N21}$ is turned OFF, a residual current still flows through the transistor $M_{N20}$. According to an exemplary embodiment of the present disclosure, the size of the resistor $R_{22}$ may be further based on a maximum allowable (residual) current through the resistor $R_{22}$ during the active state. As the size (i.e., resistance) of the resistor $R_{22}$ determines the voltage at the node $N_{21}$, for a given current flow through the transistor $M_{N20}$, a larger size of such resistor can provide a same voltage for a smaller current. Furthermore, and as described above with reference to FIG. 3A and FIG. 3B, presence of the optional charging element (340) in the configuration shown in FIG. 3C may not be necessary.

Figure 3D:
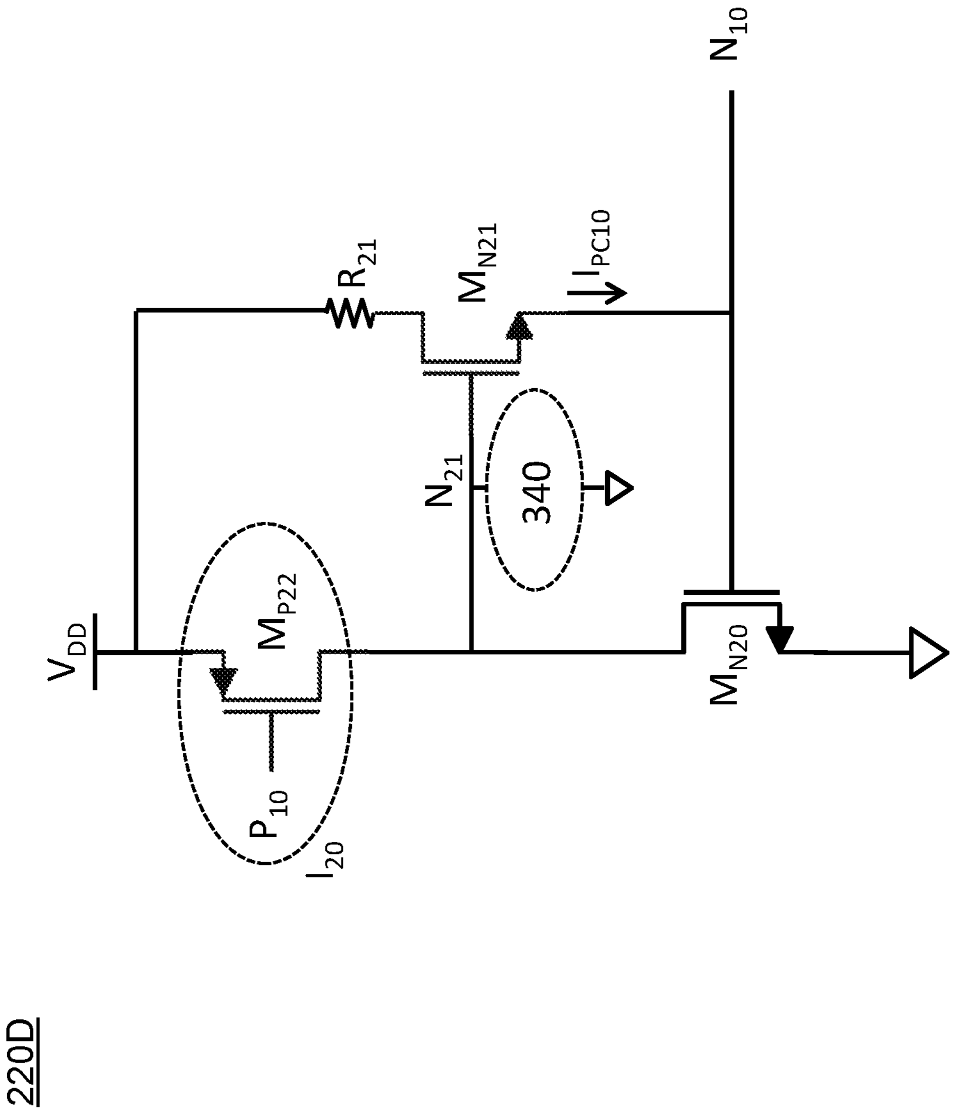
FIG. 3D shows an embodiment according to the present disclosure of the pre-charging circuit of FIG. 2 comprising a current mirror to generate a current.

FIG. 3D shows an embodiment according to the present disclosure of a pre-charging circuit (220D) which can be used as the pre-charging circuit (220) described above with reference to FIG. 2. In particular, the pre-charging circuit (220D) represents a specific implementation of the pre-charging circuit (220A) described above with reference to FIG. 3A wherein the current source $I_{20}$ is implemented via a P-type current mirror leg (e.g. $M_{P22}$) that mirrors a current (e.g., $I'_{REF}$ of FIG. 1D) that is used to generate the reference current $I_{REF}$ of the current mirror (e.g. $M_{N10}$, $M'_{N10}$, $I_{REF}$ of FIG. 2). Operation of the pre-charging circuit (220A) as described above with reference to FIG. 3A equally applies to the pre-charging circuit (220D) of FIG. 3D.

Figure 1D:
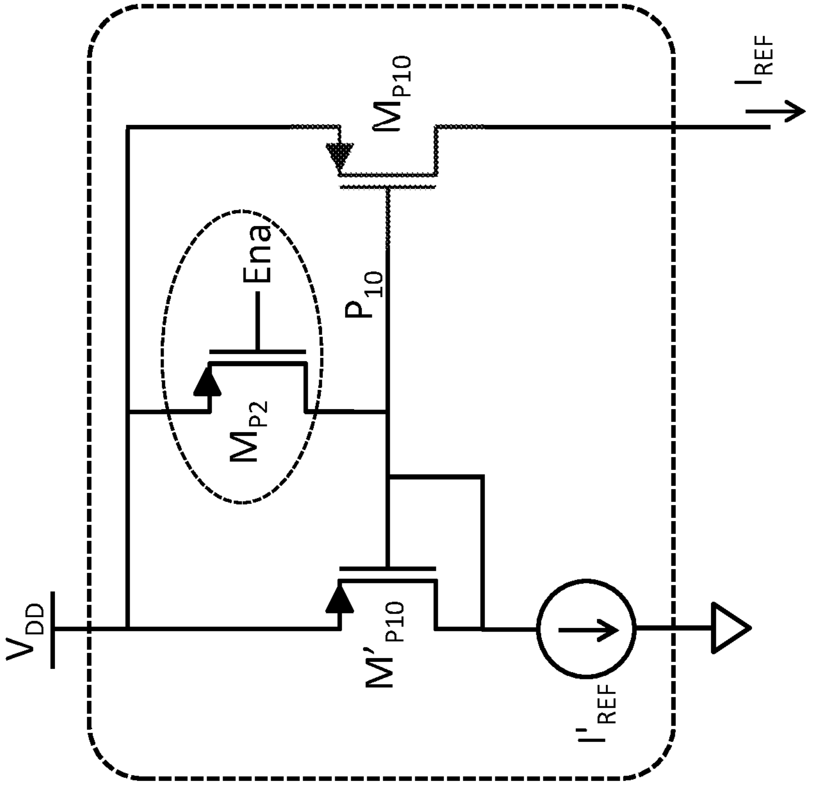
FIG. 1D shows a prior art configuration of a P-type current mirror that can be used to provide a reference current to the N-type current mirror of FIG. 1A.

With continued reference to FIG. 3D, and further reference to FIG. 1D, a P-type transistor $M_{P22}$ with a gate coupled to the node $P_{10}$ (of FIG. 1D) is used to provide a current leg that mirrors the current $I'_{REF}$ of FIG. 1D. In other words, the current source $I_{20}$ of FIG. 3D is generated via a current mirror ($M_{P22}$, $M'_{P10}$, $I'_{REF}$) in a same way as the reference current $I_{REF}$ is generated via the current mirror ($M_{P10}$, $M'_{P10}$, $I'_{REF}$) described above with reference to FIG. 1D. Accordingly, activation and deactivation of the current source $I_{20}$ of FIG. 3D is enslaved to the activation and deactivation of the current mirror ($M_{P10}$, $M'_{P10}$, $I'_{REF}$) (e.g., via the control signal Ena of FIG. 1D, Ena being the complement of /Ena of FIG. 2).

With further reference to FIG. 3D, when the control signal Ena is high (i.e., and /Ena is low, current mirror activated), the transistor $M_{P22}$ is ON and therefore a (constant) current flows from the supply voltage $V_{DD}$ through the transistor $M_{P22}$ to charge the charging element (340). Accordingly, during the fast pre-charge phase of the node $N_{10}$, such current from the current source $I_{20}$ (i.e., transistor $M_{P22}$) first charges the node $N_{21}$ to turn ON the transistor $M_{N21}$. As the pre-charge current $I_{PC10}$ charges the node $N_{10}$, the transistor $M_{N20}$ gradually turns ON (conducts current) and current flows through the transistor $M_{N20}$. By selecting a size of the transistor $M_{N20}$ such as to fully drain all of the current sourced by the transistor $M_{P22}$ when the voltage at node $N_{10}$ reaches the pre-charge voltage, once the pre-charge voltage is reached, no current will be available to drive the transistor $M_{N21}$ and therefore the transistor $M_{N21}$ immediately turns OFF (e.g., irrespective of the gate-to-source voltage) thereby stopping the flow of the pre-charge current $I_{PC10}$ through the node $N_{10}$.

A person skilled in the art will appreciate advantages provided by the configuration shown in FIG. 3D wherein ratios of sizes of transistors only is used to provide operation of the pre-charging circuit (220D) based on currents that accordingly track over process and temperature variations. In turn this eliminates/reduces variation in the pre-charge voltage that (effectively) causes the pre-charge current $I_{PC10}$ to stop, thereby providing a more stable and consistent operation of the pre-charging circuit. Furthermore, it allows to target a pre-charge voltage that is closer to the steady state voltage without concerns of overshooting (to a level that is above the steady state voltage). Furthermore, by ratiometrically relating the various currents in play, a target cutoff for sourcing of the pre-charge current $I_{PC10}$ to the node $N_{10}$ may be made with respect to a magnitude of the output current $I_{OUT}$ of the current mirror (e.g., $M_{N10}$, $M'_{N10}$, $I_{REF}$ of FIG. 2).

Figure 3E:
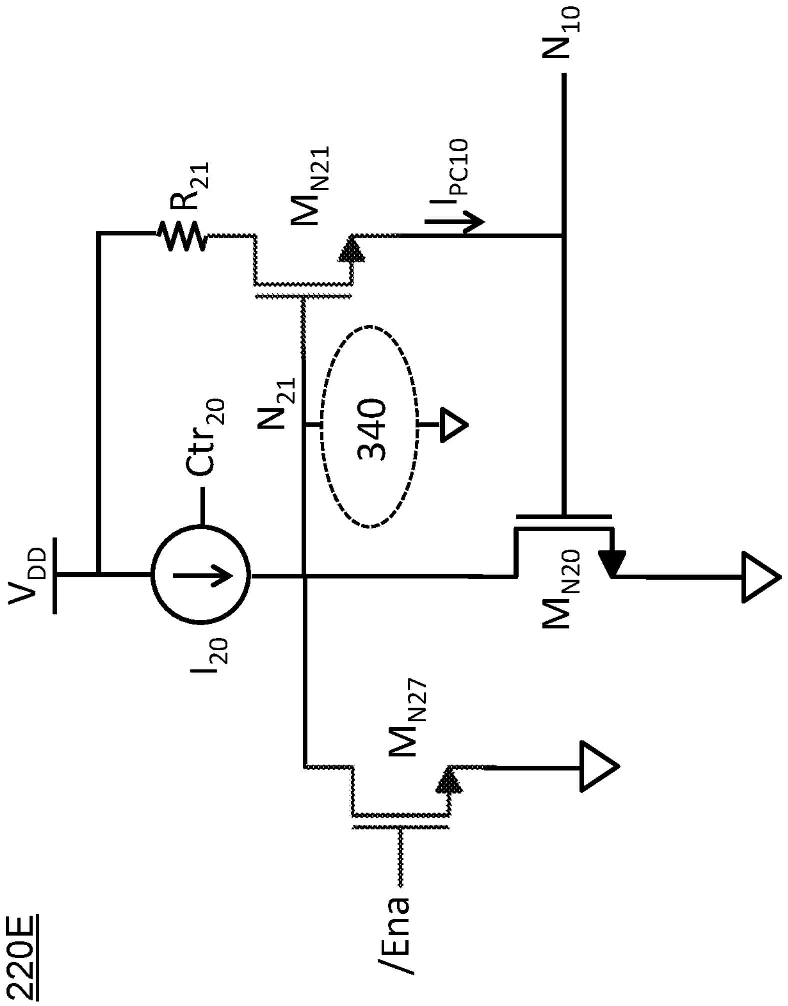
FIG. 3E shows an embodiment according to the present disclosure of the pre-charging circuit of FIG. 2 comprising a switching arrangement for activation and deactivation of the pre-charging circuit.

FIG. 3E shows an embodiment according to the present disclosure of a pre-charging circuit (220E) which can be used as the pre-charging circuit (220) described above with reference to FIG. 2. In particular, the pre-charging circuit (220E) represents any of the specific implementations described above with reference to FIGS. 3A-3D with an added switching arrangement (e.g., $M_{N27}$) that can be used to further activate and deactivate operation of the pre-charging circuit. In particular, a (N-type) transistor switch $M_{N27}$ coupled to the node $N_{21}$ may be used short the node $N_{21}$ during the inactive state (e.g., Ena is high) of the pre-charging circuit (220E).

Figure 4:
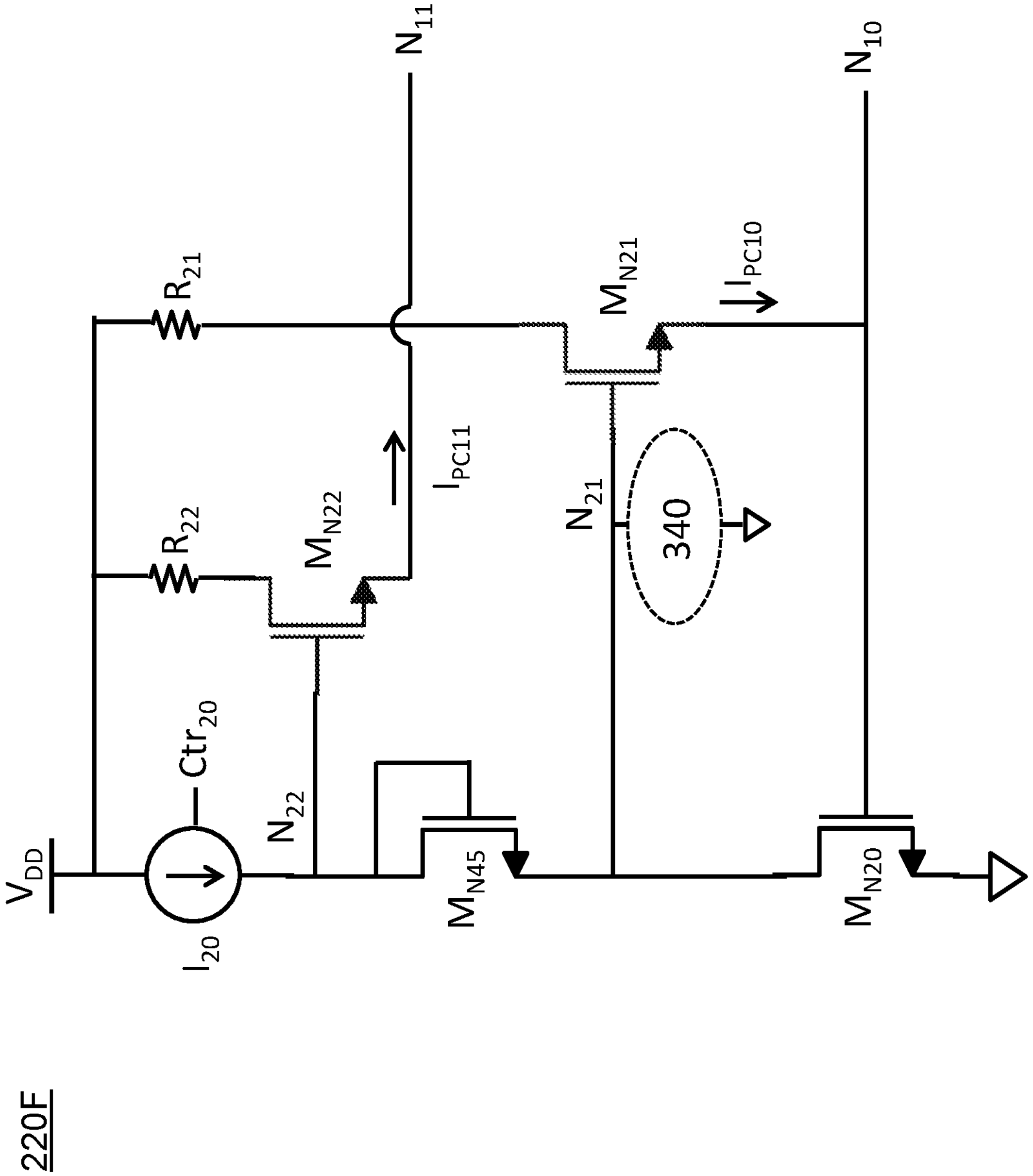
FIG. 4 shows an embodiment according to the present disclosure of a pre-charging circuit used to speed up operation of the cascoded configuration of FIG. 1B.

FIG. 4 shows an embodiment according to the present disclosure of a pre-charging circuit (220F) which can be used as the pre-charging circuit (220) described above with reference to FIG. 2 for a case wherein the output leg of the current mirror (e.g., $M_{N10}$, $M'_{N10}$, $I_{REF}$ of FIG. 2) includes the cascoded configuration (100B) described above with reference to FIG. 1B. In particular, the pre-charging circuit (220F) may be used to speed up operation of the cascoded configuration of FIG. 1B by pre-charging not only the node $N_{10}$, but also nodes (e.g., $N_{11}$, . . . , etc.) of gates of the cascode transistors (e.g., $M_{N11}$, . . . , etc.) of the output leg (e.g., 110 of FIG. 1B). Pre-charging of the nodes (e.g., $N_{11}$, . . . , etc.) provided via respective pre-charge currents (e.g., $I_{PC11}$, . . . , etc.) generated via respective source follower circuits (e.g., $M_{N22}$ and $R_{22}$ for node $N_{11}$) as shown in FIG. 4.

With continued reference to FIG. 4, during the inactive state of the current mirror (e.g., $M_{N10}$, $M'_{N10}$, $I_{REF}$ of FIG. 2 with /Ena at a high level), no current flows through the current source $I_{20}$ and therefore the nodes ($N_{21}$, $N_{22}$, . . . , etc.) shown in FIG. 3A are at about zero volts. On the other hand, during the active state of the current mirror (e.g., $M_{N10}$, $M'_{N10}$, $I_{REF}$ of FIG. 2 with /Ena at a high level), a current flows through the current source $I_{20}$ which initially charges node $N_{21}$ through the diode-connected (N-type) transistor $M_{N45}$, and therefore charges the node $N_{22}$ (e.g., one forward diode voltage drop above node $N_{21}$). In turn, charging of the nodes $N_{21}$ and $N_{22}$ cause the transistors $M_{N21}$ and $M_{N22}$ to turn ON and therefore to source pre-charge currents $I_{PC10}$ and $I_{PC11}$ to respective nodes $N_{10}$ and $N_{11}$ (it is noted that nodes $N_{10}$ and $N_{11}$ can be considered as common nodes to the input and output legs of the current mirror shown in FIG. 1B). Similar to the description above with reference to FIG. 2, pre-charging of the nodes $N_{10}$ and $N_{11}$, continues until the cutoff voltage (i.e., pre-charge voltage) is sensed at the gate of the transistor $M_{N20}$ via node $N_{10}$. Once the cutoff voltage is reached, the transistors $M_{N21}$ and $M_{N22}$ to turn OFF and therefore sourcing of pre-charge currents $I_{PC10}$ and $I_{PC11}$ to respective nodes $N_{10}$ and $N_{11}$ stop. A person skilled in the art would clearly understand that principle of operation of the pre-charge circuit (220F) may be readily understood by the above detailed description of FIG. 2 and FIGS. 3A-3F.

Figure 5:
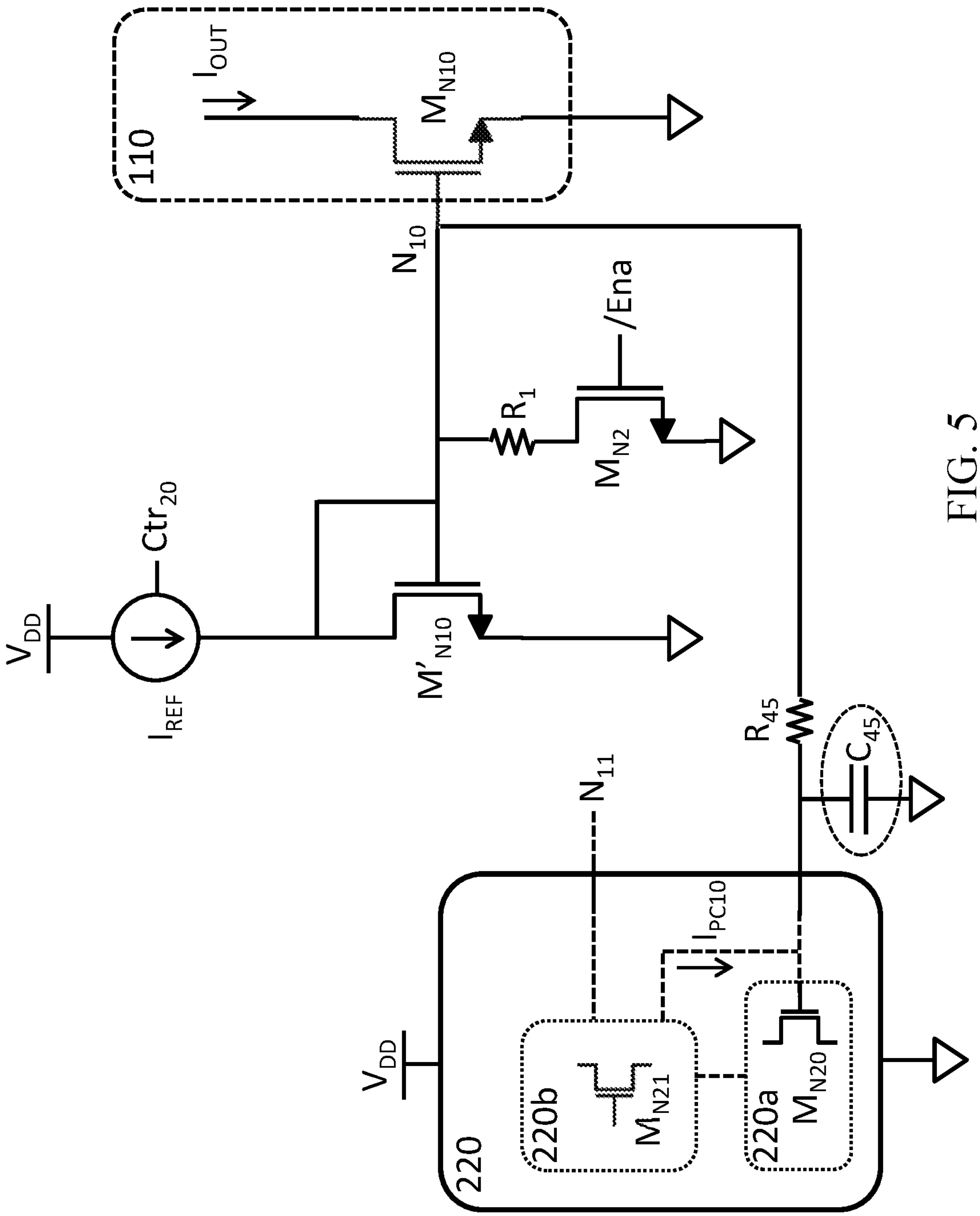
FIG. 5 shows a block diagram of a pre-charging circuit according to an embodiment of the present disclosure used to speed up operation of an N-type current mirror while controlling a timing of a pre-charge current burst.

FIG. 5 shows a block diagram of a pre-charging circuit (220) according to an embodiment of the present disclosure used to speed up operation of an N-type current mirror ($M_{N10}$, $M'_{N10}$, $I_{REF}$) while controlling a timing of a pre-charge current (e.g., $I_{PC10}$) burst. A person skilled in the art would recognize that the configuration shown in FIG. 5 is similar to one described above with reference to FIG. 2 with added (series-connected) resistor $R_{45}$ and optional (shunted) capacitor $C_{45}$ that in combination may be used to control timing of a burst of the pre-charge current $I_{PC10}$ provided to the node $N_{10}$.

With continued reference to FIG. 5, the resistor $R_{45}$ can be used to limit/control any overshoot of a voltage at the node $N_{10}$ when the pre-charge circuit (220) is (initially) activated by controlling the rate of the pre-charge current (e.g., initial burst of the current $I_{PC10}$), with smaller values of $R_{45}$ yielding in a higher/faster rate. In other words, $R_{45}$ may be used to dynamically control the onset of the pre-charge current $I_{PC10}$. According to an embodiment of the present disclosure, the resistor $R_{45}$ may be used to control timing of the pre-charge burst (e.g., pre-charge rate) of the current $I_{PC10}$ to the node $N_{10}$, while the ratio of the transistors of the pre-charge circuit (e.g., $M_{N20}$, $M_{N21}$ as described above) may be used to determine the (cutoff) voltage level at the node $N_{10}$ up to which the pre-charge burst continues. It should be noted that even in presence of an initial overshoot at the node $N_{10}$ that may be caused by the onset of the pre-charge current $I_{PC10}$, the final voltage value at the node $N_{10}$ (i.e., steady state voltage) is determined by charging of the node $N_{10}$ solely/exclusively/only by the current $I_{REF}$ (and not the pre-charge current $I_{PC10}$). In some embodiments the optional shunting capacitor $C_{45}$ may be used to provide added (voltage) stability during operation of the pre-charge circuit (220).

Figure 6:
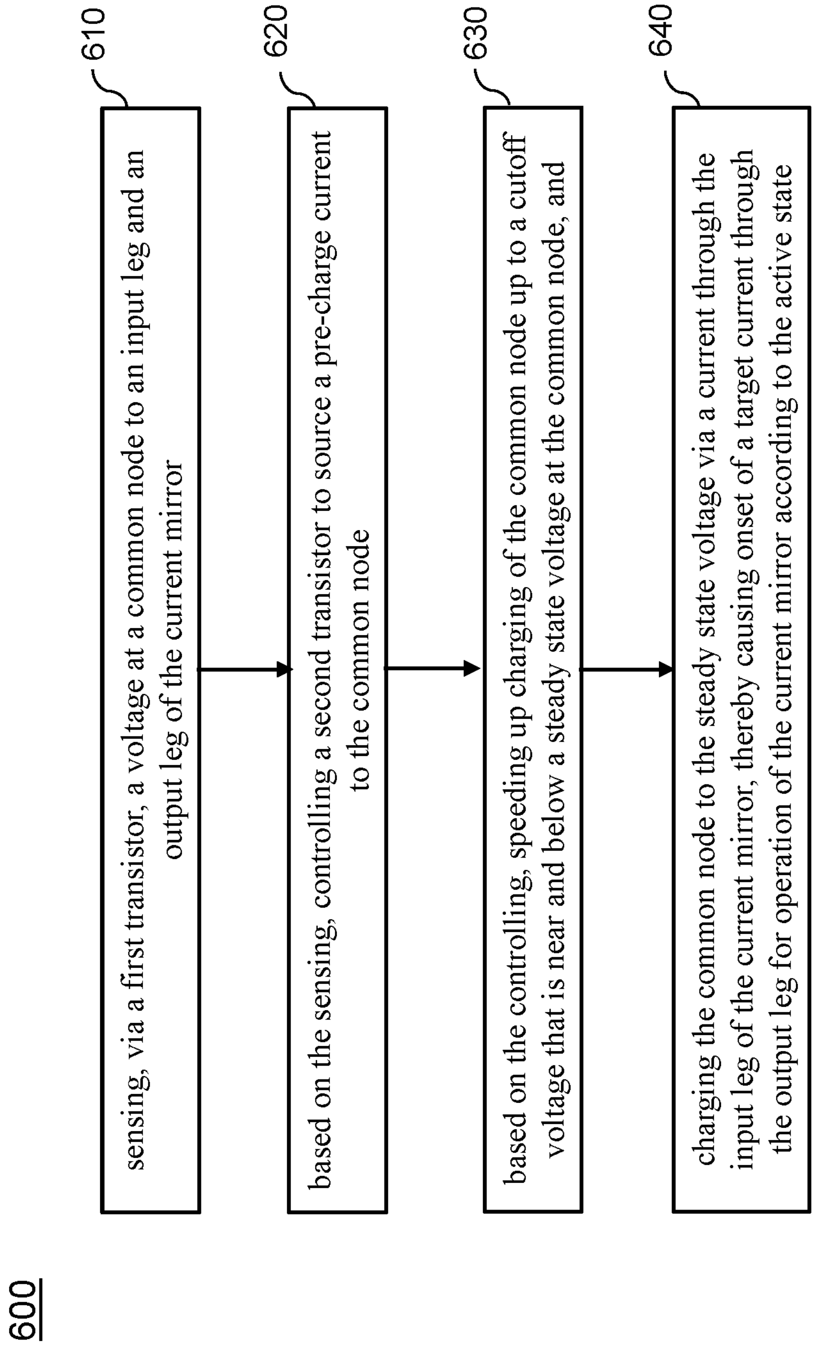
FIG. 6 is a process chart showing various steps of a method according to the present disclosure for reducing a transition phase between an inactive state and an active state of a current mirror.

FIG. 6 is a process chart (600) showing various steps of a method according to the present disclosure for reducing a transition phase between an inactive state and an active state of a current mirror. As shown in FIG. 6 such steps comprise: sensing, via a first transistor, a voltage at a common node to an input leg and an output leg of the current mirror, per step (610); based on the sensing, controlling a second transistor to source a pre-charge current to the common node, per step (620); based on the controlling, speeding up charging of the common node up to a cutoff voltage that is near and below a steady state voltage at the common node, per step (630); and charging the common node to the steady state voltage via a current through the input leg of the current mirror, thereby causing onset of a target current through the output leg for operation of the current mirror according to the active state, per step (640).

It should be noted that while the above description is mainly provided with respect to pre-charging of an exemplary N-type current mirror (e.g., $M_{N10}$, $M'_{N10}$, $I_{REF}$ of FIG. 2 and FIG. 5), teachings according to the present disclosure may equally apply to a P-type current mirror provided minor circuit modifications that are well within the ability of a person skilled in the art.

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

The invention claimed is:

1. A circuital arrangement, comprising:
a main current mirror comprising an input leg and an output leg, the input leg tied to the output leg at a first common node of the main current mirror, operation of the main current mirror comprising an inactive state and an active state; and
a pre-charging circuit coupled to the first common node, the pre-charging circuit comprising:
a first transistor coupled to the first common node, the first transistor configured to sense a voltage at the first common node during the inactive state, the active state and a transition phase from the inactive state to the active state; and
a second transistor coupled to the first common node, the second transistor configured to source a pre-charge current to the first common node based on a voltage sensed at the first common node by the first transistor;
wherein, during the inactive state, the voltage at the first common node is about zero volts and the first transistor is turned OFF.

2. The circuital arrangement of claim 1, wherein:
a magnitude of the pre-charge current is different from zero only during a portion of the transition phase.

3. The circuital arrangement of claim 1, wherein:
the active state is defined by steady state voltage at the first common node for a flow of a target current through the output leg, and
during the transition phase, the pre-charge current charges the first common node to a pre-charge voltage that is near and below the steady state voltage.

4. The circuital arrangement of claim 1, wherein:
the first transistor comprises a gate coupled to the first common node, and
the second transistor comprises a source coupled to the first common node.

5. The circuital arrangement of claim 4, wherein:
the first transistor is configured as a common-source transistor, and
the second transistor is configured as a common-drain transistor.

6. The circuital arrangement of claim 4, wherein:
a drain of the first transistor is coupled to a gate of the second transistor.

7. The circuital arrangement of claim 4, wherein:
the pre-charging circuit further comprises a current source coupled to the drain of the first transistor and to the gate of the second transistor.

8. The circuital arrangement of claim 7, wherein:
the pre-charging circuit further comprises a series connected resistor coupled between the current source and the drain of the first transistor.

9. The circuital arrangement of claim 8, wherein:
during the transition phase, a current that flows from the current source through the drain of the first transistor causes a voltage drop across the series connected resistor that turns ON the second transistor.

10. The circuital arrangement of claim 8, wherein:
when the first common node is at a voltage that is equal to, or larger than, the pre-charge voltage, a current that flows from the current source through the drain of the first transistor causes a voltage drop across the series connected resistor that turns OFF the second transistor.

11. The circuital arrangement of claim 7, wherein:
a size of the first transistor is such that when the first common node is at a voltage that is equal to, or larger than, the pre-charge voltage, a totality of a current from the current source flows through the first transistor.

12. The circuital arrangement of claim 11, wherein:
the size of the first transistor and sizes of transistors of the main current mirror are ratiometrically related.

13. The circuital arrangement of claim 11, wherein:
the current from the current source and a current that flows through the input leg of the main current mirror are mirrored from a same reference current.

14. The circuital arrangement of claim 1, wherein:
the first transistor and the second transistor are coupled to the first common node through a resistor.

15. The circuital arrangement of claim 1, wherein:
the first transistor and the second transistor are coupled to the first common node through a series connected resistor coupled to a shunted capacitor.

16. The circuital arrangement of claim 1, further comprising:
a switching arrangement coupled to the first common node, the switching arrangement configured to short the first common node during an inactive state of the main current mirror.

17. The circuital arrangement of claim 1, wherein:
the input leg comprises a diode-connected common-source transistor,
the output leg comprises a common-source transistor, and
the common-source transistor of the input leg and the common-source transistor of the output leg are ratiometrically related.

18. The circuital arrangement of claim 17, wherein:
a gate of the diode-connected common-source transistor is tied to the first common node, and
a gate of the common-source transistor is tied to the first common node.

19. The circuital arrangement of claim 17, wherein:
the output leg further comprises one or more cascode transistors in series connection with the common-source transistor of the output leg,
the input leg further comprises one or more diode-connected transistors in series connection with the common-source transistor of the input leg, and
gates of the one or more cascode transistors of the output leg are coupled to respective gates of the one or more diode-connected transistors of the input leg at respective one or more additional common nodes of the main current mirror.

20. The circuital arrangement of claim 1, wherein:
the pre-charging circuit further comprises a current source, and
the first transistor is configured to drain a current from the current source with a current magnitude that increases based on an increase of the volage sensed at the first common node by the first transistor.

21. A circuital arrangement, comprising:
a main current mirror comprising an input leg and an output leg, the input leg tied to the output leg at a first common node of the main current mirror, operation of the main current mirror comprising an inactive state and an active state; and
a pre-charging circuit coupled to the first common node, the pre-charging circuit comprising a first transistor coupled to the first common node and a second transistor coupled to the first common node;

the first transistor being configured to sense a voltage at the first common node and the second transistor being configured to provide a pre-charge current to the first common node in response to the voltage sensed at the first common node by the first transistor;

wherein, during the inactive state, a voltage at the first common node is about zero volts and the first transistor is turned OFF.

22. The circuital arrangement of claim 21, wherein:

the active state is defined by steady state voltage at the first common node for a flow of a target current through the output leg, and during the transition phase, the pre-charge current charges the first common node to a pre-charge voltage that is near and below the steady state voltage.

23. The circuital arrangement of claim 21, wherein:

the first transistor comprises a gate coupled to the first common node, and the second transistor comprises a source coupled to the first common node.

* * * * *